United States Patent [19]
Balkanski

[11] Patent Number: 4,730,383
[45] Date of Patent: Mar. 15, 1988

[54] INTEGRABLE SOLID STATE BATTERY AND PROCESS FOR PRODUCING SAME

[76] Inventor: Minko Balkanski, 2, avenue de Camöens, 75016 Paris, France

[21] Appl. No.: 859,819

[22] Filed: May 5, 1986

[30] Foreign Application Priority Data

May 3, 1985 [FR] France ................................. 85 06782

[51] Int. Cl.$^4$ ........................................... H01M 10/38
[52] U.S. Cl. .................................... 29/623.5; 429/191; 429/124
[58] Field of Search ................................ 429/124, 191; 148/DIG. 115; 29/623.5

[56] References Cited

U.S. PATENT DOCUMENTS 4,294,898 10/1981 Hartstein ............................. 429/104
4,299,890 11/1981 Rea et al. ............................. 429/124

FOREIGN PATENT DOCUMENTS 0051947 10/1980 European Pat. Off. .
0103470 9/1982 European Pat. Off. .
2550015 2/1985 France .
5721073 7/1980 Japan .
58-126679 1/1982 Japan .
59-224065 6/1983 Japan .

OTHER PUBLICATIONS

Holloway et al., Oriented Growth of Semiconductors. IV. Vacuum Deposition of Epitaxial Indium Antimonide, Journal of Applied Physics, vol. 37, No. 13, Dec. 1966, pp. 4694-4699, 148-DIG. 115.
Geis et al., Crystallographic Orientation of Silicon on an Amorphous Substrate using an Artificial Surface-relief Grating and Laser Crystallization, Appl. Phys. Lett. 35(1), Jul. 1, 1979, pp. 71-74, 148-DIG. 152.
The Condensed Chemical Dictionary, Hawley, 1981, pp. 621 and 981.
Handbook of Chemistry and Physics, Weast, 56th Edition, 1975-1976, p. B-108.

Primary Examiner—Donald L. Walton
Attorney, Agent, or Firm—Lowe, Price, LeBlanc, Becker & Shur

[57] ABSTRACT

This invention relates to a process for producing a solid state battery successively comprising, superposed between two metallic contact elements, a layer or thin film of an alkali metal such as lithium, constituting a source of ions, a layer or thin film of a superionic solid electrolyte and a layer or thin film of a layered intercalation compound capable of inserting ions issued from the alkali metal film. The lamellae of the film of layered compound are oriented so that their c-axis is substantially parallel to the surface of the solid electrolyte. The process consists essentially in making the layer or thin film of layered compound by direct grafting on the film which is to serve as substrate therefor, on which is initially impressed a grating which conditions the nucleation starting the crystal growth by means of the techniques of molecular beam deposition. The invention also relates to a battery made in accordance with this process.

7 Claims, 2 Drawing Figures

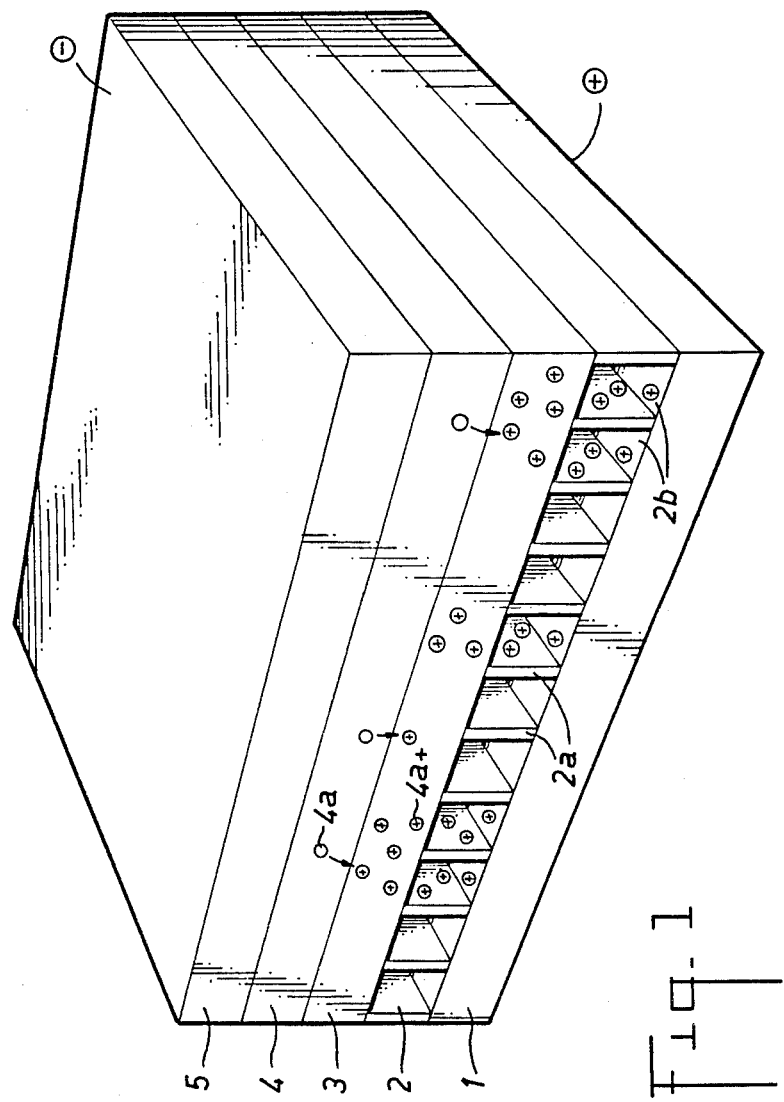

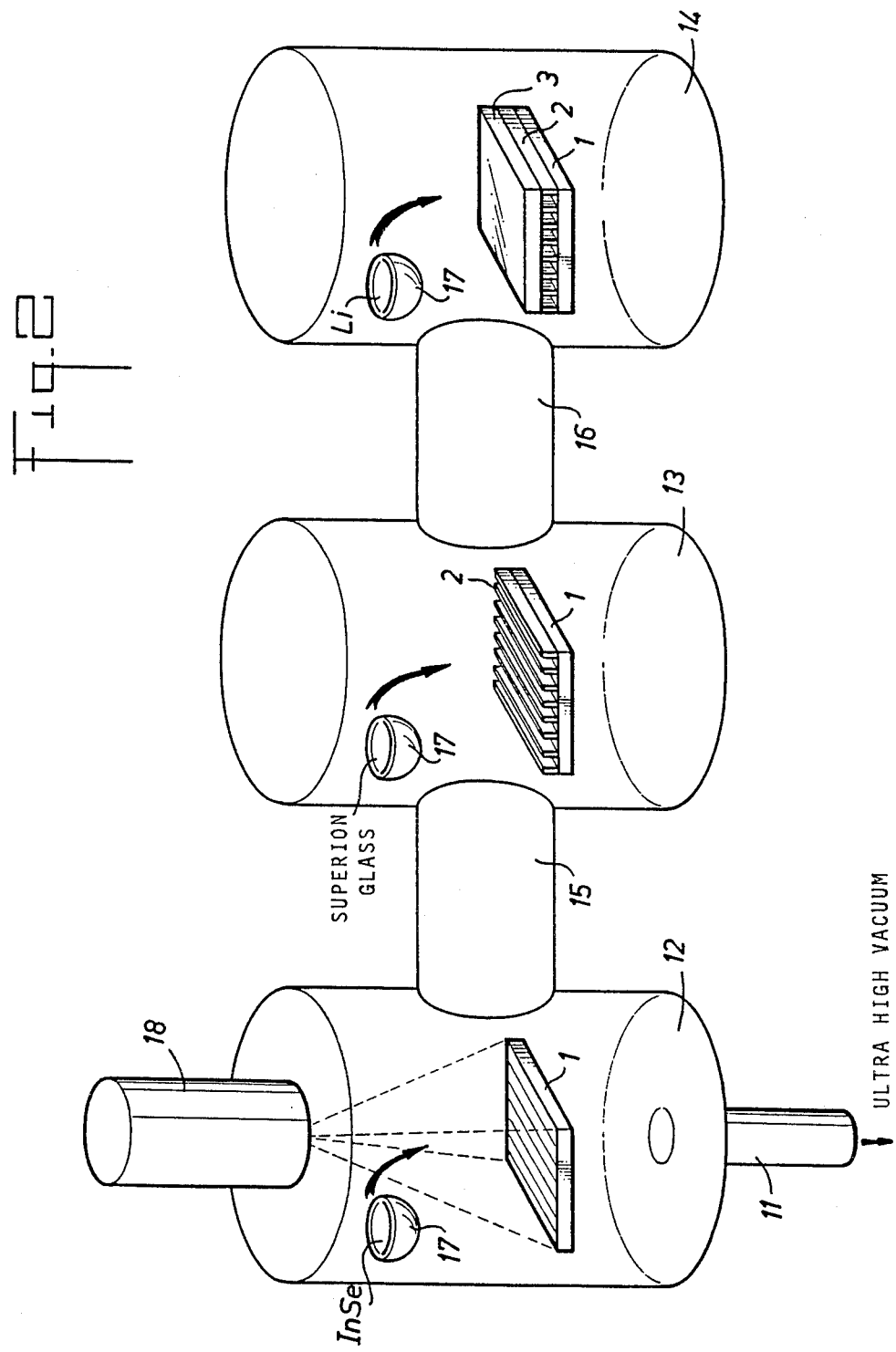

INTEGRABLE SOLID STATE BATTERY AND PROCESS FOR PRODUCING SAME

This invention relates to a process for producing a solid state battery successively comprising, superposed between two metallic contact elements, a layer or thin film of an alkali metal such as lithium, constituting a source of ions, a layer or thin film of a superionic solid electrolyte and a layer or thin film of a layered intercalation compound capable of inserting ions issued from the alkali metal film.

The batteries obtained by the related process can be primary or secondary batteries.

The lamellae of the film of layered compound are oriented such that their c-axis of substantially 0° with the surface is the electrolyte, in order to optimize the diffusion coefficient of $Li^+$. Orientations of the c-axis of the film of layered compound of different from 0° are also part of the invention and correspond to a smaller diffusion coefficient. The diffusion coefficient is typically as large as $10^{-9}$ cm$^2$/s when the angle of the c-axis is of 0° and the lamellae the film of layered compound are orthogonal to the surface of the solid electrolyte, whereas it is as small as $10^{-14}$ cm$^2$/s when the angle of the c-axis is of 90° and the lamellae are parallel to the surface of the electrolyte.

Batteries of this type employ, in addition to a superionic solid electrolyte, a layered compound capable of accumulating ions, by intercalation in its Van der Waals' gaps, up to considerable densities. The intercalation of ions at a molar ratio has already been obtained and it is therefore possible to accommodate one ion per elementary cell of the layered compound. This leads to charge densities on the order of $10^5$ coulombs/mole and to capacities, in the case of electrolytic capacitors, on the order of $3.10^3$ farads/cm$^3$.

It is an object of the present invention to define a process for producing batteries of this type, making it possible to attain very high charge densities in periods of time sufficiently short to be acceptable in practice.

This process essentially consists in making the layer of layered compound by direct grafting on the layer which is to serve as substrate therefor, on which is initially impressed a grating which conditions the nucleation starting the crystal growth by means of the techniques of deposition by molecular beam. Such an embodiment is possible in ultrahigh-vacuum chambers.

More particularly, the layer of layered compound may be created by deposition by molecular beam on the surface of the substrate, said surface presenting a grating whose pitch is compatible with that of the lamellae of the layered compound.

The grating of the substrate is obtained by a special treatment, which consists for example of a clivage to obtain vicinal surfaces, or chemical etching of crystallites, of inducing a set of electrically charged lines, induced by scanning the surface with ions electrons or X photons, etc. on which the nucleation and the lamellae of the layered compound are grown.

When the corrugation is obtained by treatment on the metal, one can obtain a vicinal surface of a metal such as Ni or Cu by cutting the metal surface near a dense plane. A grating can also be obtained on a metal by partial oxidation forming for example a reconstruction P(2.2) or P(4.4) where one oxygen atom is bound to every third surface atom or to every fifth surface atom respectively. A grating can also be obtained by chemical etching of a polycrystalline surface, some of the faces of the crystallites dissolving faster than others.

Corrugation can also be obtained by treatment on the electrolyte by creating a grating of electrically charged lines, obtained by scanning the surface with a very fine beam of particles-ions, electrons, X photons, etc.

In an embodiment of the process according to the invention, the layer of layered compound is created by molecular beam deposition on one of the contact elements which presents a corrugation, and, on the layer thus obtained, the layer of superionic electrolyte, then the layer of alkali metal are formed. Conversely, it may also be provided to create the layer of layered compound by molecular beam deposition on the layer of superionic electrolyte, formed on the layer of alkali metal, after deposit of said latter layer on one of the contact elements.

The invention also relates to a solid state battery successively comprising, superposed between two metallic contact elements, a layer or thin film of an alkali metal such as lithium, constituting a source of ions, a layer or thin film of a superionic solid electrolyte and a layer or thin film of a layered intercalation compound capable of inserting ions issued from the alkali metal film. The lamellae of the film of layered compound are oriented substantially perpendicularly to the surface of the solid electrolyte, the compound being a substance of formula $InSe$ or $In_2Se_3$ or of formula $MPX_3$ where M is a metal selected from the group Fe, Ni and Co, P is phosphorus and X is a metalloid selected from the group O, S, Se and Te or of formula $MX_2$ where M is a metal selected from the group Ti, Zr, Hf, Nb, Ta, Mo or W and X is a metalloid selected from the group O, S, Se, and Te. This compound must generally be a mixed ionic and electronic conductor. As for the superionic solid electrolyte, it must be of high ionic conductivity and very low electronic conductivity; it is preferably constituted by a glass of the lithio-borate type of formula $B_2S_3$-$Li_2S$-$LiI$ or another superionic conductor such as $Li_3N$, or $LiI$, etc.

The three layers mentioned above (anode-ion source, superionic conductor electrolyte and cathode-intercalation compound) are preferably constituted by deposits made successively on one of the metallic contact elements, this leading to a structure where the electrolyte/electrode interfaces are formed by continuous growth and constitute hetero-junctions. The layers are advantageously thin films, of thickness less than 1 μm.

Regarding the layer of layered compound, the efficiency of the intercalation, which determines the capacity of the battery, depends on the orientation of the lamellae which constitute it with respect to its substrate. Said capacity will be optimum if the whole layer of layered compound is completely intercalated at least to the molar concentration, each elementary cell then having received one intercalation ion. The maximum thickness of this layer is a function of the coefficient of diffusion of the intercalation ions, as well as of the duration of the intercalation process.

Regarding the layer of superionic electrolyte, its thickness may go largely below 1 μm, whilst remaining sufficient for the electronic resistance of the layer to remain very high and in order to avoid dielectric breakdown under the effect of the voltage of the battery. In this way, said layer remains a nearly-perfect electronic insulator, this allowing the battery to be stored for long durations when not used. On the other hand, its ionic resistance is favourably reduced due to the decrease in its thickness. When the thickness of the electrolyte is of the order of the size of the mean free path of the ions, their mobility will be extremely high and ionic conductivity extremely large.

The constitutive layers of anode, electrolyte and cathode of said battery may be themselves made of several layers or thin films.

The invention is also directed to a battery obtained by repetition of said three layers or thin films of the elementary battery defined above.

It is seen from the foregoing that the invention makes it possible to produce micro-miniaturized solid state batteries of high capacity, which, by their structure and dimensions, are perfectly compatible with the integrated circuits widely used in the domain of electronics. An integrated circuit, incorporating such a battery, offers complete operational independence in a volume which is only slightly larger.

The invention will be more readily understood on reading the following description with reference to the accompanying drawings, in which:

FIG. 1 schematically shows, in perspective and on a considerably enlarged scale, a solid state battery according to the invention.

FIG. 2 schematically shows an apparatus for producing the battery of FIG. 1.

Referring now to the drawings, the battery shown in FIG. 1 is composed of superposed thin layers between two contact elements. It comprises:

a metallic contact element 1 made of an appropriately chosen metal, such as nickel for example, constituted by a thick substrate or a thin layer deposited on a substrate;

a thin intercalation layer 2 of layered compound, for example InSe, of which the lamellae 2a are oriented in the direction of the thickness of the layer, substantially perpendicularly to the surface of the latter;

a thin layer 3 constituted by a superionic conductor (solid electrolyte), for example a glass of the lithioborate type of formula $B_2S_3-Li_2S-LiI$;

a thin layer 4 of lithium, forming a source of ions $4a+$ going through the electrolyte layer 3;

a thin metallic contact layer 5 made for example of nickel.

The layered layer 2 constitutes the cathode of the battery and the positive pole is connected to the adjacent contact element 1, whilst the layer of lithium 4 constitutes the anode, the negative pole being connected to the contact element 5 adjacent thereto.

During the battery changing operation, the lithium atoms $4a$ of layer 4 are ionized in the electrolyte layer 3 and the ions $4a+$ reach the lamellar intercalation layer 2 and penetrate directly into the Van der Waals' gaps $2b$ separating the lamellae $2a$. These gaps are thus filled with ions $4a+$ up to the molar concentration of one ion for each InSe unit cell of the layer 2.

A difference in potential thus appears between layers 2 and 4, therefore between contact elements 1 and 5, element 1 being taken to a positive potential with respect to that of element 5. This difference in potential is capable of creating a discharge current in a user circuit connected to the + and − terminals of the battery, as the process of intercalation of the ions in the layer 2 is a reversible phenomenon.

To make the battery of FIG. 1, the apparatus shown in FIG. 2 may be used, which comprises three ultra-high-vacuum chambers 12, 13, 14, connected together by lock chambers 15 and 16, as well as to an ultra-high-vacuum pump via a conduit 11. Each chamber contains a molecular beam furnace 17, in which is placed a substance which may be vaporized, by a heating means (not shown), with a view to obtain a deposit of said substance on a substrate introduced into the chamber.

In the first chamber 12 is disposed a metallic substrate 1 and the substance InSe intended to form the layered layer 2 is placed in the corresponding furnace 17. A device 18, annexed to the chamber, is provided to form, by bombardment of particles, a grating on the surface of the substrate 1, formed by electrically charged parallel lines and having a pitch compatible with the pitch of the lamellae of the layered compound InSe. Device 18 comprises to this end a source of particles (ions, electrons or X photons) associated with an ion gun designed so that the scanning of the substrate 1 can be effected along the lines of the desired grating.

In this first chamber 12, the substrate 1 thus receives a layer of compound InSe which grows along the lines, created on the substrate by the ion bombardment by device 18, on which starts the nucleation pattern which conditions the growth by molecular beam deposition. After starting of the formation of the lamellae, the operation of said device 18 may be stopped.

Obtaining an appropriate graft of the lamellar compound 2 on the metallic substrate 1 firstly involves an appropriate treatment of the substrate, comprising a cleaning followed, if necessary, by the deposit of an adsorbed layer, in order to prepare an ordered surface offering a parameter of order compatible with the characteristics of the layered compound to be deposited. It also involves the respect of conditions leading to a suitable growth of the nuclei created along the grating of electrically charged lines printed on the surface of the substrate, so that the intercalation planes pass continuously through the layer formed.

The substrate 1, coated with the layer 2 of InSe of which the lamellae are substantially perpendicular to the surface of the substrate, is then transferred, via lock chamber 15, into the second chamber 13 in which furnace 17 contains superionic lithioborate glass ($B_2S_3$-$Li_2S$-LiI). This substance forms a thin layer 3 by vapor deposit on layer 2.

Assembly 1, 2, 3 is then transferred into the third chamber 14, via lock chamber 16, where it receives a thin layer 4 of lithium which is formed by vapor deposition on the superionic layer 3.

Finally, a metallic deposit 5 is made on layer 4.

It is also possible to proceed in reverse order and to deposit on contact element 5 the lithium anode 4, on which is then deposited the superionic conductor electrolyte 3. It is on this electrolyte layer that the polarization grating is then formed which allows molecular beam deposition of the cathode of layered compound 2 with lamellae $2a$ substantially perpendicular to the electrolyte layer 3.

The principal chamber 12 where the graft of the layer of the lamellar intercalation compound on substrate 1 is to be effected, should be endowed with characterization means, both crystallographic (LEED) and chemical (localized Auger spectrometry) and electronic (XPS and UPS), making it possible to monitor correct development of the different steps of the process.

I claim:

1. A process for producing a solid state battery successively comprising, superimposed between two metallic contact elements, a layer or thin film of an alkali metal which provides a source of ions, a layer of thin film of superionic solid electrolyte glass of high ionic conductivity and a layer or thin film of a layered intercalation compound capable of inserting ions issued from the layer or thin film of alkali metal, the lamellae of the film of layered compound being oriented substantially perpendicularly to the surface of the solid electrolyte, said process comprising the steps of (a) forming on a substrate film surface a grating of electrically charged lines or of oxygenated surface atoms, and (b) molecular beam depositing the layer or thin film of the layered compound by direct grafting on the substrate film, said grating conditioning the nucleation starting of the layered growth.

2. The process of claim 1, wherein the layer of layered compound is created by molecular beam deposition on one of the contact elements, and, on the layer thus obtained, the layer of superionic electrolyte and the layer of alkali metal are formed, respectively.

3. The process of claim 1, wherein the layer of layered compound is created by molecular beam deposition on the layer of superionic electrolyte which is formed on the layer of alkali metal, after deposit of said latter layer on one of the contact elements.

4. The process of claim 1, wherein the grating comprises electrically charged lines formed by scanning the substrate film surface with a very fine beam of electrons, ions or X photons.

5. The process of claim 4, wherein the grating of electrically charged lines comprises parallel lines having a pitch compatible with the pitch of the lamellae of the layered compound.

6. The process of claim 1, wherein the grating comprises oxygenated surface atoms formed by partial oxidation of the substrate film surface atoms.

7. The process of claim 1, wherein the molecular beam deposition is performed in an ultrahigh vacuum chamber.

* * * * *